United States Patent
Akhter et al.

(10) Patent No.: US 11,448,184 B1
(45) Date of Patent: Sep. 20, 2022

(54) SELF-ADAPTIVE VARIABLE TWIST MORPHING BLADE FOR WIND TURBINE

(71) Applicant: UNITED ARAB EMIRATES UNIVERSITY, Al Ain (AE)

(72) Inventors: Md. Zishan Akhter, Al Ain (AE); Farag Khalifa Omar, Al Ain (AE); Ahmed Riyadh Ali, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/585,333

(22) Filed: Jan. 26, 2022

(51) Int. Cl.
    *F03D 7/02*    (2006.01)
    *F03D 1/06*    (2006.01)

(52) U.S. Cl.
    CPC ........... *F03D 7/022* (2013.01); *F03D 1/0675* (2013.01); *F05B 2240/31* (2013.01); *F05B 2260/77* (2013.01)

(58) Field of Classification Search
    CPC ...... F03D 7/022; F03D 7/0224; F03D 1/0675; F03D 1/0683; F05B 2240/31; F05B 2240/311; F05B 2260/77
See application file for complete search history.

(56) References Cited

U.S. PATENT DOCUMENTS

| | | | | |
|---|---|---|---|---|
| 1,982,039 A | * | 11/1934 | Youngberg | F03D 7/0224 416/89 |
| 1,986,752 A | * | 1/1935 | Rorvik | F03D 7/0224 416/89 |
| 2,052,454 A | * | 8/1936 | Ellwood | F03D 7/0224 416/89 |
| 2,117,788 A | * | 5/1938 | Cable | B64C 11/343 416/89 |
| 4,257,740 A | * | 3/1981 | Duez | F03D 7/0224 416/202 |
| 4,324,528 A | * | 4/1982 | Svenning | F03D 7/0224 416/135 |
| 4,495,423 A | * | 1/1985 | Rogers | F03D 7/0224 290/55 |

(Continued)

FOREIGN PATENT DOCUMENTS

| | | | |
|---|---|---|---|
| CN | 108223273 A | 6/2018 | |
| DE | 3143686 A | * 5/1983 | ........... F03D 1/0675 |

(Continued)

*Primary Examiner* — David E Sosnowski
*Assistant Examiner* — Wayne A Lambert
(74) *Attorney, Agent, or Firm* — Nath, Goldberg & Meyer; Richard C. Litman

(57) ABSTRACT

The twist morphing blade for wind turbine is a blade adapted for attachment to the hub of a wind turbine. The blade has a central shaft extending between the root and tip ends of the blade. A guide track is defined in the central shaft. A sliding mass is slidably disposed in the guide track and bears against a bias spring. A driven shaft is coaxially disposed around the sliding mass and bias spring and rotatably coupled to the sliding mass. Connecting rods extend between the driven shaft and root end of the blade and through active and passive ribs alternately spaced between the driven shaft and the root end of the blade. When incident wind rotates the rotor, centrifugal force linearly slides the mass, which rotates the driven shaft and the connecting rods to deflect the ribs, twist morphing the medial sections of the blade.

9 Claims, 3 Drawing Sheets

(56) References Cited

U.S. PATENT DOCUMENTS

| | | | | |
|---|---|---|---|---|
| 4,952,119 A | * | 8/1990 | Widseth | F03D 7/0252 |
| | | | | 416/33 |
| 5,286,166 A | * | 2/1994 | Steward | B63H 3/008 |
| | | | | 416/89 |
| 6,761,533 B2 | * | 7/2004 | Favaro | F03D 7/0224 |
| | | | | 416/51 |
| 7,172,392 B2 | * | 2/2007 | Wastling | F03D 7/0256 |
| | | | | 416/135 |
| 7,789,624 B2 | * | 9/2010 | Appa | F03D 7/0224 |
| | | | | 416/41 |
| 8,602,732 B2 | * | 12/2013 | Wilson | F03D 1/0683 |
| | | | | 416/41 |
| 8,821,121 B2 | * | 9/2014 | Carter | F03D 7/0224 |
| | | | | 416/88 |
| 2003/0223868 A1 | * | 12/2003 | Dawson | F03D 7/0236 |
| | | | | 416/1 |
| 2005/0201862 A1 | | 9/2005 | Wastling et al. | |
| 2007/0205603 A1 | * | 9/2007 | Appa | F03D 7/0224 |
| | | | | 290/55 |

FOREIGN PATENT DOCUMENTS

| | | | | |
|---|---|---|---|---|
| GB | 258952 A | * | 10/1926 | |
| JP | 57191475 A | | 11/1982 | |
| JP | 59176472 A | | 10/1984 | |

* cited by examiner

SELF-ADAPTIVE VARIABLE TWIST MORPHING BLADE FOR WIND TURBINE

BACKGROUND

1. Field

The disclosure of the present patent application relates to wind turbine blades, and particularly to a twist morphing blade for wind turbine that automatically twists the blade to optimize the angle of attack of the blade in response to prevailing wind conditions.

2. Description of the Related Art

Wind energy is one of the major contributors to the interest in renewable energy sources, and the growth of the wind energy industry has led to the development of massive multi-megawatt wind turbines. The performance of wind turbines is enhanced by controlling the flow and boundary-layer around the blade(s) using flow-control devices, blade-morphing, and other techniques.

Twist morphing is one of the most promising means to enhance the aerodynamic performance of wind turbines. Twist morphing is performed by active spanwise twisting, which results in continuous variation of the angle of attack along the blade. Twist morphing enables the turbines to be operated in extreme or off-rated wind conditions, such as insufficient wind, high winds, and variable winds, thereby augmenting the net Annual Energy Production (AEP) and enhancing the overall power efficiency of the wind turbine. It further improves the turbine aeroacoustics, suppressing structural vibrations and flutter. Current models of twist morphing incur a heavy actuation penalty, which undermines its effectiveness. The technique is also known as "warping", especially when applied to apply the same effect to aircraft wings ("wing warping").

Continuous enlargement of rotor size has led to massive state-of-the-art wind turbines, for example, up to 222 meters diameter, that operate over a variety of atmospheric conditions and experience increased turbulence, local gust-induced fluctuations, wind shear (horizontal and vertical), blade-tower interference, and yaw/tilt misalignment, among others. Therefore, performance enhancement techniques are introduced on the wind turbines to achieve performance enhancement, increase reliability, improve load control, and provide power regulation. These goals are attempted by applying pitching and aeroelastic twist, active/passive flow control devices, blade morphing, and other aerodynamic adjustment techniques to the blades. The commonly used pitching mechanism has the limitation of being ineffective against highly dynamic and non-uniform inflow experienced by large multi-MW wind turbines. The large size of the blades undermines the efficacy of uniform aeroelastic twist as well. Likewise, flow control devices are also characterized by numerous shortcomings and offer enhancements over restricted flow conditions. These devices cannot optimize performance over the entire flow/operation regime of the wind turbine.

Mini/small wind turbines (for example turbines up to 3 meters in diameter) represent a growing sector in the wind energy industry. Such turbines can be primarily employed for utility-compatible electricity production for commercial and residential applications, off-grid electricity generation, and mini-grid power generation. Shape-adaptive twist morphing blades enable wind turbines to be operated in the extreme off-rated conditions, such as insufficient and/or high winds, thereby enhancing the overall performance efficiency and augmenting net Annual Energy Production (AEP). This feature is highly rewarding for geographical regions characterized by average wind speed of less than 5 m/s and has potential to be employed as a versatile energy source, especially in remote regions and regions with limited electric infrastructure. By way of example, such small wind turbines can be used in Sub-Saharan Africa, where close to 0.5 billion of the population does not have access to electricity.

However, existing adaptive twist morphing draws massive actuation power compared to the net power production, especially at lower wind speeds, which renders the mechanism unattractive for implementation. Thus, a twist morphing blade for wind turbine solving the aforementioned problems is desired.

SUMMARY

The twist morphing blade for wind turbine is a blade adapted for attachment to the hub of a wind turbine. The blade has a central shaft extending between the root and tip ends of the blade. A guide track is defined in the central shaft near the tip end of the blade. A sliding mass is slidably disposed in the guide track and bears against a bias spring. A driven shaft is coaxially disposed around the sliding mass and bias spring and rotatably coupled to the sliding mass. Connecting rods extend between the driven shaft and the root end of the blade and through active and passive ribs alternately and axially spaced between the driven shaft and the root end of the blade. An elastomeric skin envelopes the blade. When incident wind rotates the rotor, centrifugal force linearly slides the mass, which rotates the driven shaft and the connecting rods to deflect the ribs, twist morphing the medial sections of the blade to automatically optimize the angle of attack of the blade for ambient wind conditions.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
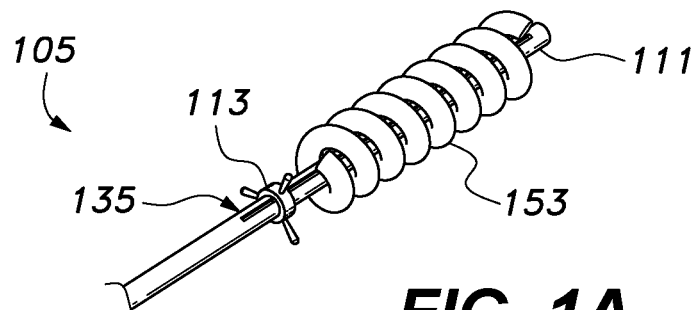
FIG. 1A is a schematic diagram of the blade tip end of the central shaft of a twist morphing blade for wind turbine, the driven shaft being omitted to show the sliding mass and the bias spring coaxially disposed between the sliding mass and the blade tip end of the central shaft.

For wind turbine blades and blades for other propeller driven mechanisms, morphing offers intended aerodynamic performance with reduced mechanical parts, complexity, weight, and comparatively smoother blade profile. The inherent challenge faced by morphing is to achieve blade shape change dynamically using low actuation power, while displaying sufficient load-bearing stiffness and strength. Morphing can be performed by actuating the blade within or out-of-the plane of the blade. In-plane morphing includes spanwise, chordwise, and sweep transformations, whereas out-of-plane morphing comprises of spanwise (bending), chordwise (camber), and twist morphing.

Twist morphing is achieved by varying the incidence angle of an airfoil (blade) by introducing spanwise continuous twist along the blade, called "warping". The technique is effective in enhancing power generation by wind turbines, particularly in low wind conditions. Further, it has effectively demonstrated load alleviation under wind conditions that would otherwise exceed the rating of the turbine. Adaptive twist morphing has been introduced, which aims at achieving localized twist variations along the span of the blade. The prominent advantage of twist morphing is optimizing the blade geometry along the length of the blade, dictated by the global operating data, including, but not limited to, wind and rotor speed. The variation in wind speed modifies tip speed ratio of the wind turbine. This requires a change in the blade geometry (localized twist morphing) to maintain optimal power generation. Adaptive twist morphing has been observed to be effective in power augmentation and load alleviation.

Twist morphing effects a warp (equivalent to a wing warp) in the aerodynamic shape of the blade. The blade is configured to have an angle of attack that can adaptively vary between the root of the blade (at the part of the blade closest to the hub) and varying toward the outer (tip) edge of the blade. Twist morphing is used to warp the blade to change the angle of attack decreasingly along the blade span, starting from the root of the blade towards the tip.

The actual angle of attack in a static condition with the blade not turning, or at conditions ranging from the static condition to maximum warp, depends on the particular blade design. This is because the blade contour taken at chords along the length of the blade can vary according to the blade design. Twist morphing (or warp) is dynamic, meaning the twist morphing or warp can vary during operation. In the example configuration described below, the dynamic change is effected by centrifugal force acting against a biasing force that counteracts the centrifugal force. In the example described below, the centrifugal force is exerted by a mass (or masses) mounted on a track within the blade, and the biasing force is exerted by a spring (or springs), also located within the blade, with the spring(s) acting on the mass(es) to counteract the centrifugal force.

Twist morphing is performed by active twisting of the entire blade, which results in continuous variation of angle of attack along the span. Twist morphing exhibits noise attenuation, vibration suppression, and superior aerodynamic control. Twist morphing mechanism based on active control of bending-torsion and/or torsion-torsion couplings of composite material requires a distributed network of piezoelectric materials. The drawbacks of such mechanisms include high cost and structural weight. Further, the large inertia of massive turbine blades limits the transient time and demands high actuation power that proves prohibitive in its further applications. Another twist morphing mechanism is based on warping of the airfoil skin. This induces morphing by introducing relative sliding between the upper and lower skin of the airfoil, near the trailing edge. This twist is generated by the rotation of a threaded rod, which enforces relative motion along the span.

In general, the ability of twist morphing to attain large deflections without undermining the aerodynamic profile has exhibited great potential for wind turbine application. It allows a wind turbine to optimally generate power over a wider range of wind speeds, thereby significantly increasing the overall energy production. The limitations of adaptive twist morphing involve mechanical complexity in design and production of blades. Other considerations are the actuation costs and operational frequency of the mechanism for industrial applications.

Figure 1B:
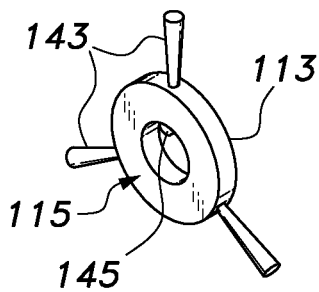
FIG. 1B is a schematic diagram of the sliding mass of FIG. 1A.
Figure 1C:
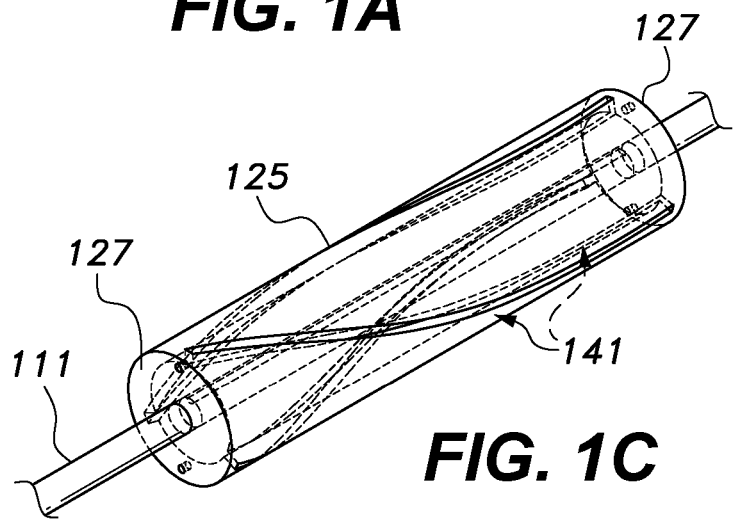
FIG. 1C is a schematic diagram of the driven shaft disposed around the blade tip end of the central shaft of the twist morphing blade of FIG. 1A.
Figure 1D:
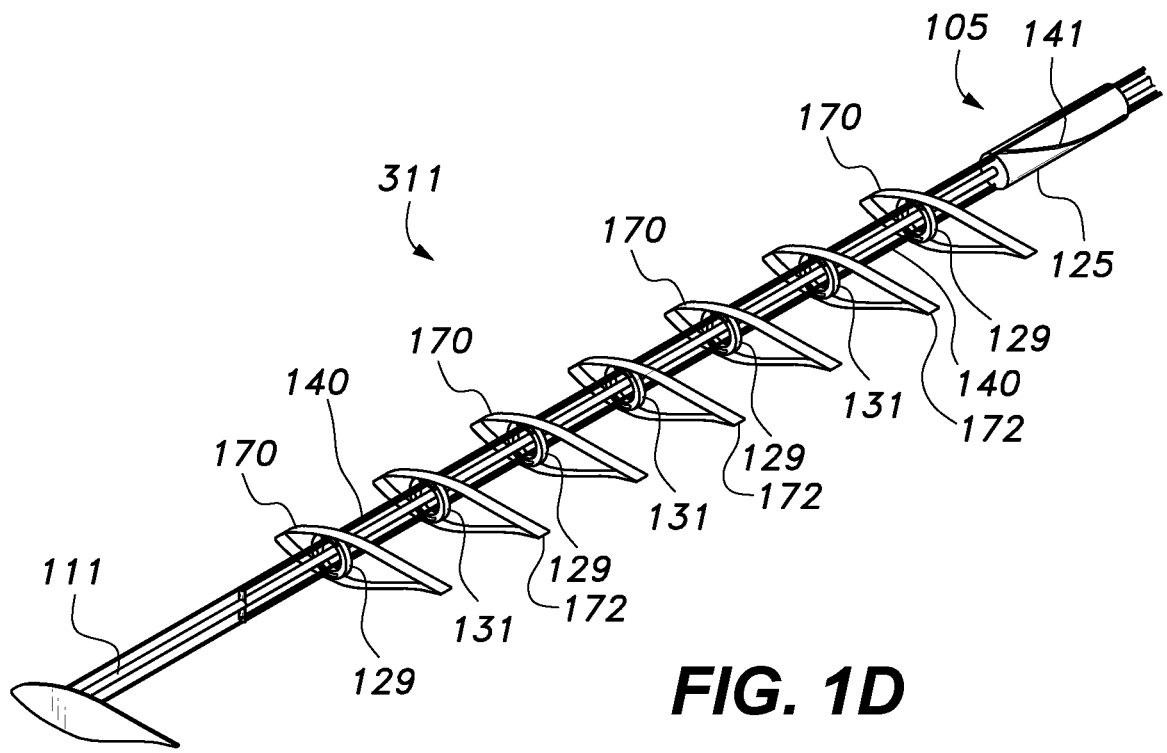
FIG. 1D is a schematic diagram of the internal structure of a twist morphing blade for wind turbine.

FIGS. 1A, 1B, 1C and 1D are schematic diagrams showing a mass-spring mechanism 105 integration including a central shaft 111 and a sliding mass 113 disposed on the central shaft 111. FIG. 1A shows the central shaft 111 and the sliding mass 113. FIG. 1B schematically shows the sliding mass 113. FIG. 1C shows the central shaft 111 and a cylindrical driven shaft 125 that houses the sliding mass 113 near the tip end of the blade. FIG. 1D shows an arrangement of the mass-spring mechanism 105 in relation to a set of disks 129 and bearings 131 rotatably mounted about the central shaft 111 between the tip end and the root end of the blade.

As shown in FIG. 1A. the central shaft 111 has a linear groove or slot 135 defined therein extending axially along the blade tip end of the central shaft 111 and defining a guide track. As shown in FIG. 1B, the sliding mass 113 is a ring-shaped body defining a central annulus 115 slightly larger in diameter than the central shaft 111. Three coupling pins 143 extend radially from the sliding mass, the coupling pins 143 being equiangular and separated by 120°. One of the coupling pins 143 has a stub end 145 extending into the central annulus 115 defined by the body of the sliding mass 113. In operation, the stub 145 slides in the slot 135 defined in the central shaft 111, constraining the sliding mass 113 to linear sliding movement on the blade tip end of the central shaft 111 and preventing rotation of the sliding mass 113 around the shaft 111 as the mass 113 slides on the shaft 111. Also shown in FIG. 1A is a helical compression spring 153 (shown in section) coaxial with the shaft 111, the spring 153 extending axially between the sliding mass 113 and the blade tip end of the central shaft 111, the spring 153 serving as a resilient counterpoise to bias the sliding mass 113 away from the blade tip end of the central shaft 111 to a position more medially disposed near the blade tip end of the central shaft 111, the coupling pins 143 bearing against and compressing the spring 153 when the mass 113 slides in one direction (outward), the spring 153 bearing against the coupling pins 143 and extending the mass 113 in the opposite direction (inward) as the compression spring 153 extends to its normal, uncompressed configuration.

As shown schematically in FIG. 1C, the driven shaft 125 is a cylindrical shell having opposing end caps 127 at the base ends of the cylindrical shell. The central shaft 111 extends through the respective centers of the end caps 127 and is journaled through the end caps 127. The cylindrical body of the driven shaft 125 has three variable pitch slots 141 defined therein, the slots 141 being radially spaced 120° and extending axially along the driven shaft 125. In operation, each of the coupling pins 143 is inserted through a corresponding one of the slots 141 so that as the sliding mass 113 slides along the central shaft 111 due to centripetal force acting on the blade, the coupling pins 143 slide in the slots 141 in the driven shaft 125, converting linear motion of the sliding mass 113 into rotary motion of the driven shaft 125.

Figure 2:
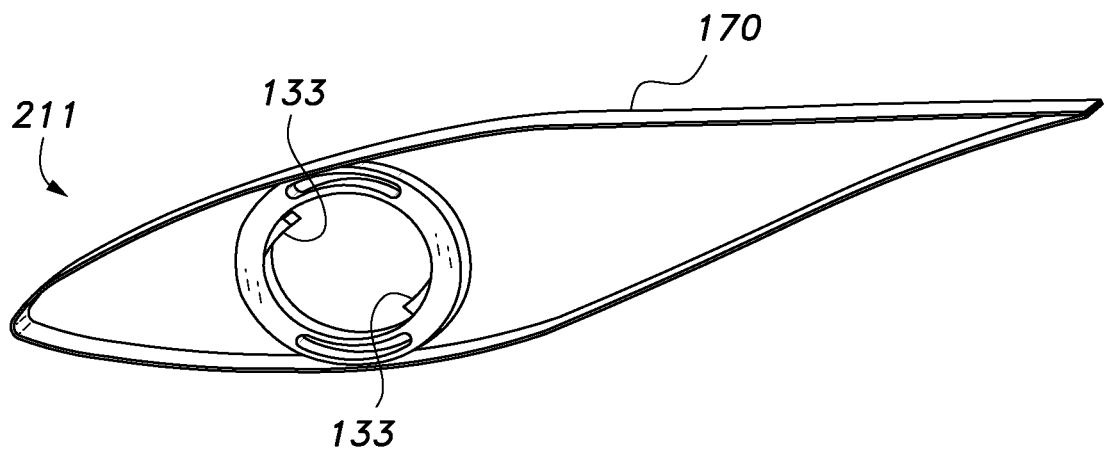
FIG. 2 is a schematic diagram of an active rib of a twist morphing blade for wind turbine.
Figure 3:
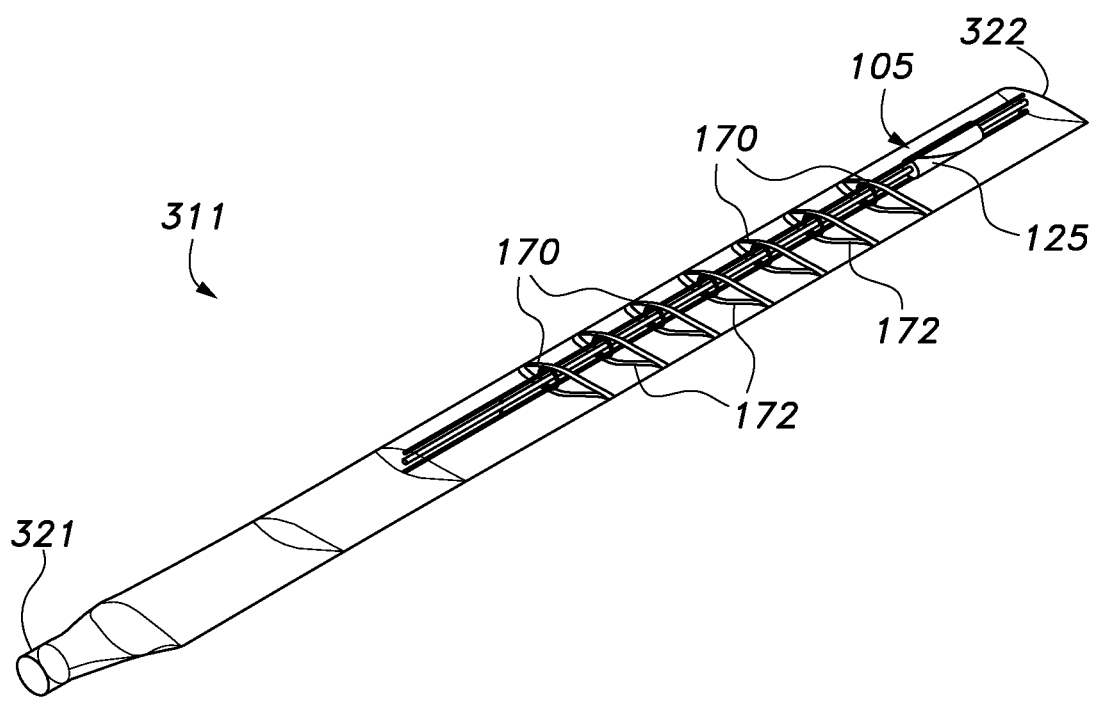
FIG. 3 is a schematic diagram of a twist morphing blade for wind turbine, showing the relative positions of the ribs and the driven shaft that actuates the ribs to twist morph the blade.

As shown in FIG. 1D and FIGS. 2 and 3, the twist morphing blade 311 includes a series of alternating active ribs 170 and passive ribs 172 extending between the driven shaft 125 and the root end 321 of the blade 311. The root end 321 of the blade 311 is attached to the rotor hub of the wind turbine, and the blade tip end 322 is the opposite free end of the blade 311. Each rib 170, 172 defines an airfoil shape and is axially fixed at a predetermined distance from the root end 321 of the blade in order to twist or warp a defined section of the blade 311. As shown in FIG. 2, each of the active ribs 170 is mounted on a disk 129 defining an annular opening having tabs 133 extending into the annular opening, the tabs 133 defining the permissible degree of angular rotation of the active rib 170 attached to the periphery of the disk 129. Each of the passive ribs 172 is attached to an annular bearing 131 similar to the disks 129, but without tabs extending into the annular opening. Each of the disks 129 is designed with a permissible degree of angular rotation of the attached active rib 170, depending on the length of the blade 311 and the anticipated wind speed or wind load in order to limit the twist of the blade 311 at particular sections along the axial length of the blade 311 to optimize the angle of attack. The passive ribs 172 are not so limited by the bearings 131 in order to assume intermediate positions between active ribs 170 to smooth the morphed contour of the blade 311. The blade 311 includes a plurality of connecting rods 140 extending parallel to the central shaft 111 between an end cap 127 of the driven shaft 125 and the root end 321 of the blade 311, the connecting rods 140 extending through the disks 129 and bearings 131 and selectively engaging the tabs 133 so that rotation of the driven shaft 125 actuates morphing of the blade 131. The connecting rods 140 may also extend between an end cap 127 of the driven shaft 125 and the tip end 322 of the blade 311, based on the positioning of the driven shaft 125 along the span of the blade 311, aimed at optimized aerodynamic performance through optimized twist morphing (warping).

The blade 311 shown in FIG. 3 is enveloped in an elastomeric skin. The deformable skin features high bending and low torsional stiffness to facilitate optimal morphing. The skin allows the deflection of the ribs 170, 172 to attain the desired morphed shape, while maintaining a wrinkle-free, smooth aerodynamic profile. The active ribs 170 are actuated by the driven shaft 125 to morph the blade 311. The passive ribs 172 are mounted to freely follow the global twist. This is done to ensure smooth twist transition along the blade 311. The number of ribs 170, 172 (and the weight of the sliding mass 113) will vary with the size of the turbine and the length of the blade 311. For example, although seven ribs are shown in the drawings, the blade 311 may have six ribs, including three active ribs 170 and three passive ribs 172 distributed alternately along the length of the blade 311. The ribs 170, 172 may also be placed between the driven shaft 125 and the tip end 322 of the blade 311, based on the spanwise positioning of the driven shaft 125 along the blade 311 for optimized twist morphing and aerodynamic performance.

It should be noted that the weight-force of the sliding mass 113 reverses direction during rotation of the turbine blades 311. It aids morphing in the lower half-cycle of rotation of the turbine's rotor, but opposes it in the upper half-cycle. An appropriate harmonic filter (such as a viscous fluid) may be introduced into the driven shaft 125 to dampen or eliminate the influence of cyclic gravitational load during wind turbine operation.

Figure 4:
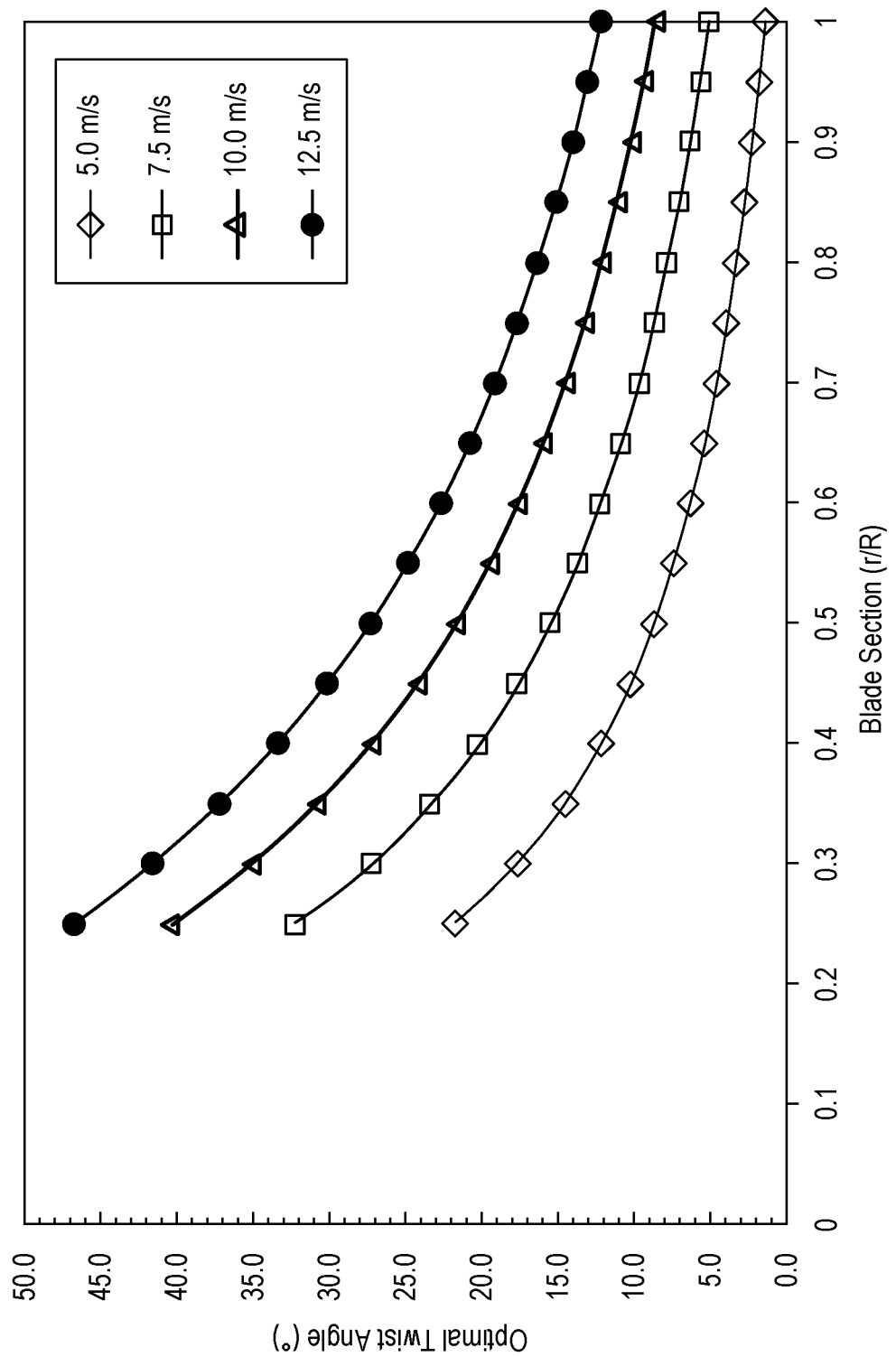
FIG. 4 is a plot of an anticipated optimal twist variation along the span of an exemplary twist morphing blade for wind turbine for various wind speeds.

The above-described twist morphing blades were integrated into an NREL Phase II research wind turbine for demonstration. The wind turbine blade is 5.03 m in length and was segmented by seven ribs between $0.55<r/R<0.85$. As shown in FIG. 4, the optimal twist (or incident) angle varies along the span of the blade. This optimal twist angle varies non-linearly with the wind speed, such that for a given wind speed increment, the desired twist augmentation varies for different blade sections. For example, an increase in wind speed from 5 m/s to 7.5 m/s requires twist optimization almost twice at the 25% span ($r/R=0.25$) than compared to the blade tip end ($r/R=1.0$). The twist morphing blade 311 accomplishes this using centrifugal force generated by rotation of the turbine as the wind impacts the turbine blades and turns the rotor to actuate morphing at the various sections of the blade, thereby avoiding any power penalty from use of an external power source, and is projected to boost annual energy production by 5-10% for this demonstration turbine.

It is to be understood that the twist morphing blade for wind turbine is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A twist morphing blade for wind turbine, comprising:
   a blade having a root end adapted for attachment to a wind turbine hub and a free tip end opposite the root end;
   a central shaft disposed within the blade, the central shaft having a linear guide track defined therein extending axially along a portion of the central shaft adjacent the tip end of the blade;
   a sliding mass disposed on the central shaft, the mass being constrained to linear sliding movement along the guide track;
   a resilient counterpoise bearing against the sliding mass, the counterpoise resiliently biasing the sliding mass away from the tip end of the blade;
   a driven shaft coaxially disposed around the central shaft, the driven shaft enclosing the sliding mass and the counterpoise, the driven shaft being coupled to the sliding mass and constrained to rotate when the sliding mass slides along the guide track;
   a plurality of ribs axially spaced on the central shaft between the driven shaft and the root end of the blade or between the driven shaft and the tip end of the blade, the ribs being dimensioned and configured to impart an airfoil shape to a medial portion of the blade; and
   a plurality of connecting rods extending between the driven shaft and the ribs, the connecting rods rotating at least some of the ribs to rotate through an arc of rotation independently in order to twist medial sections of the blade to change angle of attack of the blade in response to ambient wind conditions due to centrifugal force acting on the sliding mass.

2. The twist morphing blade according to claim 1, wherein the guide track comprises a slot defined in said central shaft.

3. The twist morphing blade according to claim 2, wherein said sliding mass comprises a ring defining an annular opening closely engaging the central shaft and a plurality of coupling pins extending radially from the ring, the pins being spaced at equal angles.

4. The twist morphing blade according to claim 3, wherein said driven shaft comprises a cylindrical shell having opposing end caps, the cylindrical shell having axially extending variable pitch helical slots defined therein, the sliding mass and the counterpoise being disposed within the cylindrical shell between the end caps, the coupling pins each extending through a corresponding one of the helical slots, whereby linear sliding movement of the sliding mass is converted to variable rotary movement of the driven shaft.

5. The twist morphing blade according to claim 4, wherein one of said coupling pins comprises a stub end extending into the annular opening of the sliding mass and into the slot defining the guide track, thereby constraining the sliding mass to linear sliding on said central shaft.

6. The twist morphing blade according to claim 1, wherein said counterpoise comprises a compression spring.

7. The twist morphing blade according to claim 1, further comprising at least one rotatable disk and at least one rotary disk bearing axially spaced on said central shaft between said driven shaft and the root end of the blade or between the driven shaft and the tip end of the blade, said at least one rotary disk bearing being freely rotatable about said central shaft, said at least one rotatable disk defining an annular opening and having at least one tab extending into the annular opening.

8. The twist morphing blade according to claim 7, wherein said plurality of ribs comprises active ribs and passive ribs alternately disposed on said central shaft, said active ribs being mounted on a corresponding said at least one rotatable disk in which the at least one tab is precalculated to permit the active rib to rotate through an arc of rotation according to prevailing wind speed and said passive ribs being mounted on a corresponding said at least one rotary disk bearing, the active ribs defining twist of the medial sections of the blade and the passive ribs following according to overall global twist of the blade to smooth transitions of a contour of the blade between adjacent pairs of the active ribs.

9. The twist morphing blade according to claim 1, further comprising a deformable, elastomeric skin enveloping the blade, the skin permitting deflection of the ribs to attain a desired morphed shape, while maintaining a wrinkle-free, smooth aerodynamic profile.

* * * * *